F. M. MOULTON.
Improvement in Animal Pokes.
No. 115,884. Patented June 13, 1871.
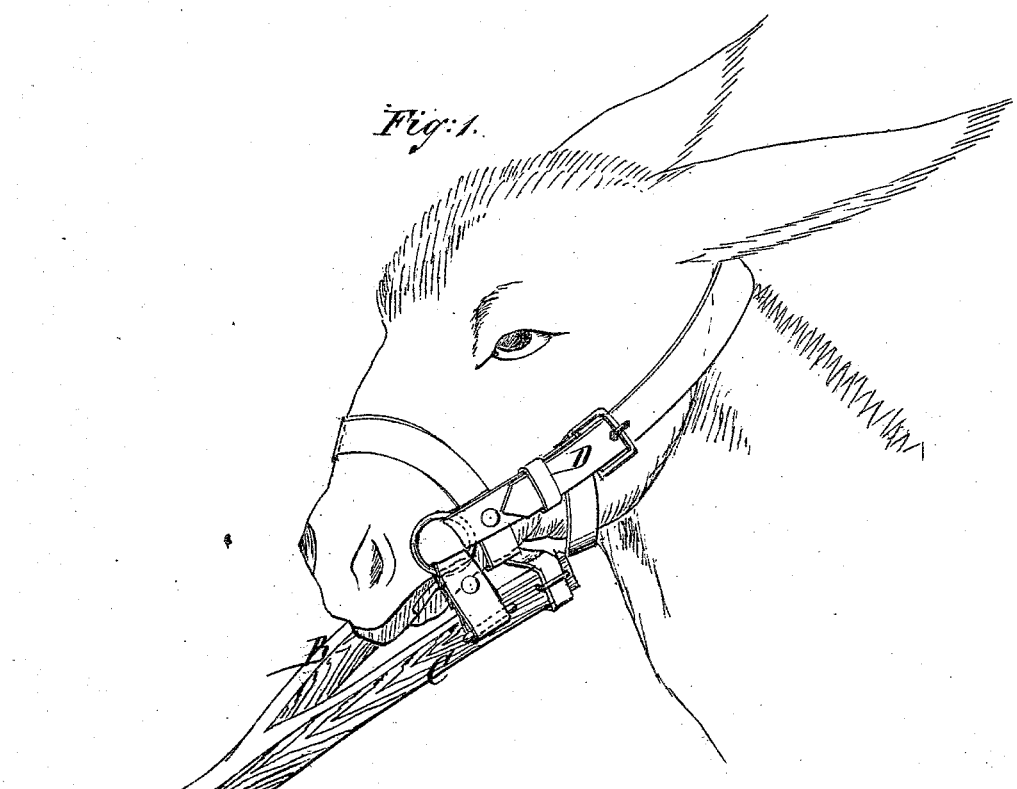
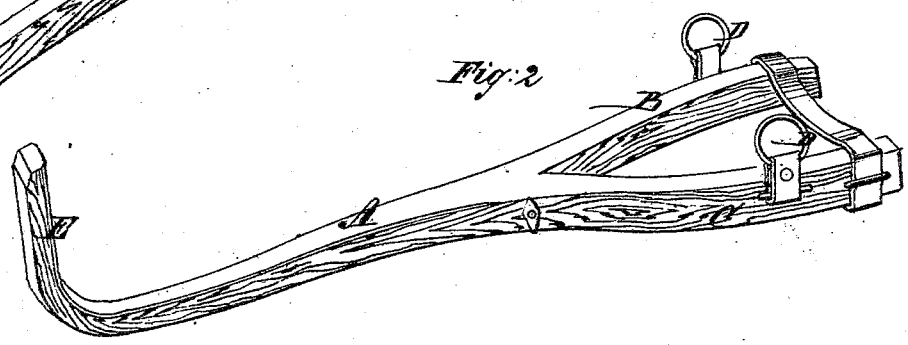

UNITED STATES PATENT OFFICE.

FORDYCE M. MOULTON, OF FERRISBURG, VERMONT.

IMPROVEMENT IN ANIMAL-POKES.

Specification forming part of Letters Patent No. 115,884, dated June 13, 1871.

*To all whom it may concern:*

Be it known that I, FORDYCE M. MOULTON, of Ferrisburg, in the county of Addison and State of Vermont, have invented a new and useful Improvement in Animal-Pokes; and I do hereby declare that the following is a full, clear, and exact description thereof, which will enable others skilled in the art to make and use the same, reference being had to the accompanying drawing forming part of this specification.

The object of this invention is to provide efficient means for preventing horses and cattle and other animals from jumping or tearing down fences and still leave the animal free to feed and move about; and it consists in a poke provided with a forked upper end, whereby it is adapted to be attached to the head of an animal, as hereinafter more fully described.

In the accompanying drawing, Figure 1 represents a view of the poke as when attached to the head of the animal or in use. Fig. 2 is a view of the poke detached.

Similar letters of reference indicate corresponding parts.

A is the poke, the upper portion of which is forked, the branches B C being sufficiently separated to admit the animal's jaws between them. D is the head-stall, which is attached to the branches B C by nails, rivets, or staples, or in any suitable manner, so that the leather straps of which it is composed will allow the poke to be strongly attached to the animal's head. The head-stall may be the same or similar to the head-stall of leather halters. It should be such as will allow the animal's jaws free play between the branches of the poke for feeding, drinking, &c. The forward portion of the poke is curved upward, as seen in Fig. 2, at E. When the animal's head is down this portion slides upon the ground; when the animal's head is up the poke projects forward, and prevents his jumping or throwing down fences and doing other mischief.

The poke may be attached to a horse, mule, or any disorderly animal, with perfect success.

Having thus described my invention, I claim as new and desire to secure by Letters Patent—

The poke A, forked at one end and curved at the other, substantially as and for the purposes described.

FORDYCE M. MOULTON.

Witnesses:
 CHARLES H. NORTON,
 CHLOE A. MOULTON.